US006797911B2

(12) United States Patent
Hara et al.

(10) Patent No.: US 6,797,911 B2
(45) Date of Patent: Sep. 28, 2004

(54) ELECTRIC DISCHARGE MACHINING ELECTRODE

(75) Inventors: Sotomitsu Hara, Tsukuba (JP); Shinichirou Yanaka, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/779,800

(22) Filed: Feb. 18, 2004

(65) Prior Publication Data

US 2004/0164054 A1 Aug. 26, 2004

(30) Foreign Application Priority Data

Feb. 24, 2003 (JP) ........................................ 2003-046248

(51) Int. Cl.[7] .............................................. B23K 1/06
(52) U.S. Cl. .................................................. 219/69.15
(58) Field of Search ............................ 219/69.12, 69.15

(56) References Cited

U.S. PATENT DOCUMENTS 3,727,489 A * 4/1973 Innoue ....................... 76/107.1
5,118,572 A * 6/1992 DeRobert et al. ........... 428/607

OTHER PUBLICATIONS

Ph. Bleys et al; "Machining Complex Shapes by Numerically Controlled EDM"; International Journal of Electrical Machining; No. 6; Jan. 2001; pp 61–69.

Z. Yu et al.; "Initiatives of Precision Engineering at the Beginning of a Millennium"; 10[th]International Conference on Precision Engineering (ICPE); Jul. 18–20, 2001; pp 199–203.

* cited by examiner

Primary Examiner—Geoffrey S. Evans
(74) Attorney, Agent, or Firm—Oliff & Berridge, PLC

(57) ABSTRACT

An electric discharge machining electrode adapted to improve the quality of a finished surface of an article by increasing a machining speed by improving the electric discharge generation rate η even in a fine machining process; and by rendering it possible to maintain constant the electric discharge generation rate η even when a time width and a voltage of the electric discharge pulses are reduced. In an electrode used in the electric discharge machining process carried out by generating electric discharge pulses between the electrode and an article, a radioactive metal is contained in the portion of the electrode in which the electric discharge pulses occur, or in the portion thereof which is in the vicinity of the portion in which the electric discharge pulses occur. The radiant rays emitted by the radioactive metal exert influence on the substances present between the article and the electrode, or processing liquids, which are usually water or oil, and works so as to promote the electrolytic dissociation of the substances. Therefore, the electric discharge generation rate η is improved.

4 Claims, 2 Drawing Sheets

ELECTRIC DISCHARGE MACHINING ELECTRODE

BACKGROUND OF THE INVENTION

1. Field of Invention

This invention relates to an electric discharge machining electrode suitable as an electrode used for an electric discharge machine such as an engraving electric discharge machine, a wire electric discharge machine, a micro electric discharge machine, a generating electric discharge machine, and the like. These machines are adapted to subject an article to an electric discharge machining process by generating electric discharge pulses between the article and an electrode disposed at a distance from the article. This invention also relates to an electric discharge machining apparatus, and more particularly to an electric discharge machining electrode capable of improving the quality of a finished surface of an article and/or increasing the machining speed. Optimization of the machining speed may be performed by improving the electric discharge generation rate $\eta$, even in a fine machining process, and even when the conditions including a time width and a voltage of the electric discharge pulses applied to the electric discharge machining electrode are the same. Optimization of the machining speed may also be performed by rendering it possible to maintain the electric discharge generation rate $\eta$, even when a time width and an applied voltage of each pulse are reduced. This invention also relates to an electric discharge machine. The present invention is preferably used for a micro electric discharge machining process.

2. Description of Related Art

In an electric discharge machining process, when a time width of pulses (which will hereinafter be referred to simply as a pulse width) of a voltage (which will hereinafter be referred to as a gap voltage) applied to a position between an article and an electric discharge machining electrode is large, the quality of the finished surface of the article lowers. Therefore, the pulse width is set to a small value in accordance with the level of required quality of the finished product.

However, when the pulse width is set to a small value, failure in the generation of the electric discharge may occur frequently, even when a voltage pulse is applied between the article and the electrode. Especially, when the area of the article that is directly opposite to the electrode is small, and when the gap voltage is low, failure occurs very noticeably.

The causes of such a failure in the generation of an electric discharge reside in the fact that a long time is needed to electrolytically dissociate any interelectrode substance existing between an article and an electric discharge electrode, i.e., for instance, processing liquid, such as pure water or oil.

The electric discharge generation rate $\eta$ will be defined as follows.

Electric Discharge Generation Rate $\eta$={(Number of Generations of Electric Discharges)/(Number of Applied Pulses)}×100 [%]

In the above equation, the <Number of Applied Pulses> is the number of applied pulses of a gap voltage, and the <Number of Generations of Electric Discharges> is the number of electric discharge pulses generated when the voltage pulses are applied between an article and an electrode. Accordingly, in a case where electric discharge pulses occur at all times when the pulses of a gap voltage are applied between an article and an electrode, the electric discharge generation rate $\eta$ in the above equation becomes 100%.

For instance, when a gap voltage and a pulse width of the applied voltage are 100V and 10 nano-seconds respectively, an electric discharge generation rate $\eta$ is only about 1% at the highest. However, when the pulse width is 10 micro-seconds with the gap voltage at the same level, the electric discharge generation rate $\eta$ becomes very close to 100%. It is true that, when the pulse width is 10 nano-seconds, a treated surface close to a specular surface may be obtained but, when the pulse width is 10 micro-seconds, the treated surface may become extremely rough.

It has been ascertained that, even when the pulse width is set to a small value, the electric discharge generation rate $\eta$ can be improved when the gap voltage is increased. However, when the gap voltage is increased, the quality of the treated surface lowers.

When an article has a larger size, the area opposite the electric discharge machining electrode becomes wide, so the electric discharge generation rate $\eta$ increases as compared with a case where an article has a small area opposite the electric discharge machining electrode. It is generally said that, when the area of an article which is opposite such an electrode is up to 0.2 mm×50 mm, the electric discharge generation rate $\eta$ is improved in exponential proportion to the area. Such relation between the electric discharge generation rate $\eta$ and the area of the article opposite the electric discharge machining electrode is called the "area effect."

However, since the fine electric discharge machining of an article of a small area of 5 $\mu$m×5 $\mu$m to 25 $\mu$m×100 $\mu$m is also much in demand, it is necessary that the electric discharge generation rate $\eta$ for an article with a small area does not decrease either.

In view of the above, when a finely machined finished product of high quality having a sub-specular surface is demanded, it is unavoidable that the electric discharge generation rate $\eta$ decreases. This necessarily causes the machining rate to decrease.

SUMMARY OF THE INVENTION

The present invention has been made in view of the above-described problems and to address the problems encountered in techniques of this kind, and aims at providing an electric discharge machining electrode capable of improving the quality of a finished surface of an article and/or increasing the machining speed. The present invention also improves the electric discharge generation rate $\eta$, even in a fine machining process, and even when the conditions including a time width and a voltage of the electric discharge pulses applied to the electric discharge machining electrode are the same, and by rendering it possible to maintain the electric discharge generation rate $\eta$ substantially constant even when a time width and an applied voltage of each pulse are reduced. The present invention is also directed to an electric discharge machining apparatus.

The present invention solves these problems by providing an electric discharge machining electrode, used as an electrode for the machining of a surface of an article carried out by generating electric discharge pulses between the article and the electrode, which is located at a distance from the article, wherein a radioactive metal is contained at least in or near the portion of the electrode in which the electric discharge occurs.

In this electric discharge machining electrode, the above-mentioned problems are addressed by forming the electrode out of a superhard material obtained by sintering a mixture containing at least a fine powder of tungsten and cobalt, turning the superhard material into a radioactive metal, as mentioned above, by irradiating the superhard material with neutrons and thereby substituting radioactive cobalt atoms for the above-mentioned cobalt atoms, and using the radioactive metal as a negative pole. The electric discharge machining electrode according to the present invention is different from a conventional electric discharge machining electrode with a superhard material in the fact that the electrode in this invention is radioactive. Also, the mechanical characteristics, such as rigidity, as well as the electrical characteristics of the electrode according to the present invention can be set identical to the mechanical and electrical characteristics of a conventional electrode, which exhibits proven results in an electric discharge machining process. Therefore, the reliability of the electrode according to the present invention during its use as an electric discharge machining of an article can be ensured.

Also, the above-mentioned problems may be addressed by providing an electric discharge machining apparatus, provided with an electric discharge machining electrode as described above.

In the electric discharge machining electrode according to the present invention, a radioactive metal is contained at least in or near the portion of the electrode in which electric discharge pulses occur. The radiant rays emitted by the radioactive metal contained in the electrode exert influence upon the substances existing between an article and the electric discharge machining electrode, which are usually processing liquids such as pure water or oil. The radiant rays emitted by the radioactive metal promote the electrolytic dissociation of these substances. The electrode according to various embodiments of the present invention is formed so as to induce the electric discharge used for the machining of an article, with the radiant rays utilized as a trigger. The radiant rays in use may be beta rays, formed of electrons.

Accordingly, the electric discharge occurs easily between the article and the electric discharge machining electrode. As mentioned above, when the area of the article opposite the electrode is small, the required quality of the treated article is high. Therefore, even when it is necessary to reduce the pulse width or gap voltage to a low level, the electric discharge generation rate η can be improved.

According to various exemplary embodiments of the present invention, the improvement of the quality of a finished surface of an article can be done by improving the electric discharge generation rate η even in a fine machining process and even when the conditions including a time width and a voltage of the electric discharge pulses applied to the electrode for the electric discharge machining process are the same, and thereby improving the machining rate. The improvement of the quality of a finished surface can also be improved by rendering it possible to maintain substantially constant the electric discharge generation rate η, even when the time width of the pulses and applied voltage are reduced.

The portion of the electric discharge machining electrode in which a radioactive metal is contained may be any portion, as long as the portion can induce the electric discharge by the radiant rays emitted by the radioactive metal as mentioned above. The present invention does not specifically limit the portion of the electrode to the above-mentioned portion. The size of the portion also depends upon the intensity of the radioactivity of the radioactive metal. The portion of the electrode in which the radioactive metal is contained need not be the entire electrode.

Generally, the portion of the electrode in which a radioactive metal is to be contained is preferably at least a portion in which electric discharge pulses occur.

BRIEF DESCRIPTION OF THE DRAWINGS

A preferred embodiment of the present invention will now be described with reference to the accompanying drawings, wherein.

DETAILED DESCRIPTION OF PREFERRED EMBODIMENTS

Figure 1:
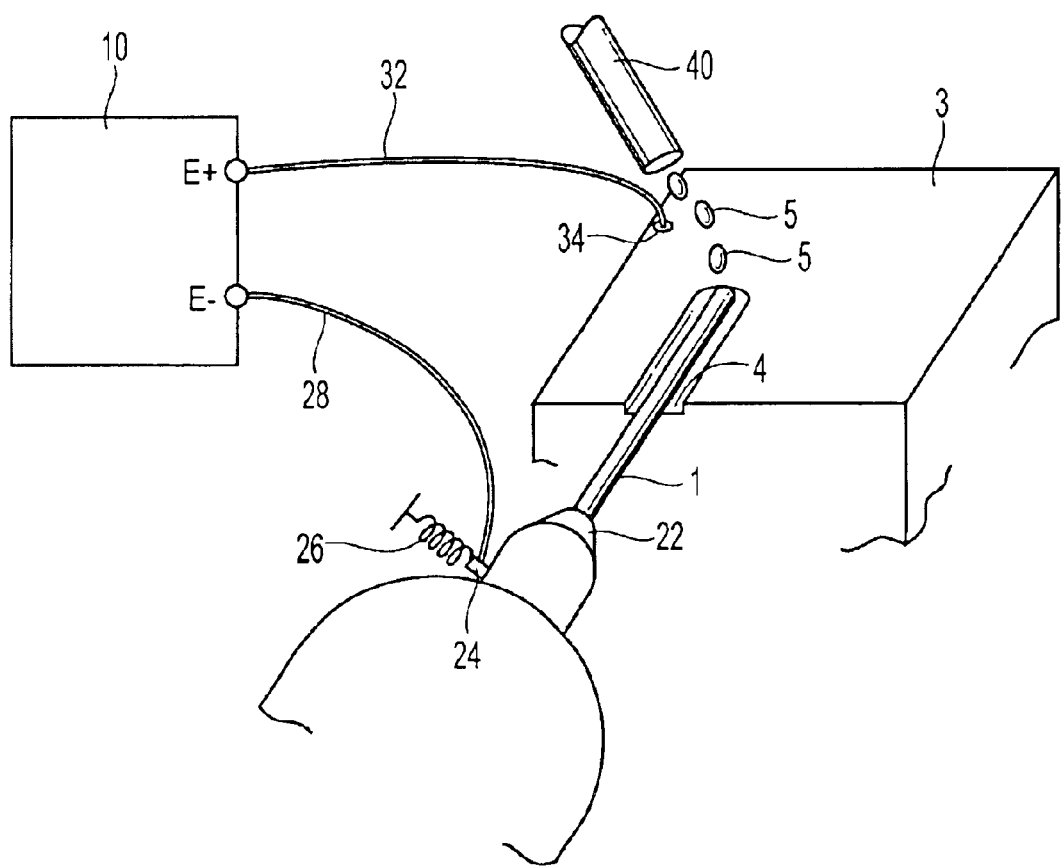
FIG. 1 is a diagram showing the structure of an electric discharge machine according to an embodiment of the present invention.

FIG. 1 is a diagram showing the structure of an electric discharge machine according to an exemplary embodiment of the present invention.

In this embodiment, an article 3 has on an upper side thereof a surface 4 to be machined. An electric discharge machining electrode 1 has a pin-like shape, and is 0.3 mm in thickness φ and around 10 mm in length. The electric discharge machining electrode 1 was made of a superhard material obtained by sintering a mixture containing a fine powder of tungsten and cobalt. This superhard material is different from a common superhard material. In this embodiment, the superhard material is irradiated with neutrons as will be described later, and the cobalt is turned into radioactive $^{60}$Co. As is clear from FIG. 1, the dimensions of article 3 are comparatively small compared to the dimensions of the above-mentioned electric discharge machining electrode 1.

Between an outer cylindrical circumferential surface of the electric discharge machining electrode 1 and the surface 4 to be machined, electric discharge pulses used for the machining of the surface 4 occur. From a dropping unit 40, a processing liquid shown by a reference numeral 5 is dropped. However, this embodiment also enables machining an article by using electric discharge pulses without using any processing liquid. In this case, the effect ascribed to the present invention can also be obtained.

A pulse generator 10 constitutes a power source unit for giving a pulse type gap voltage Vg of a predetermined pulse width to the article 3 and to the electric discharge machining electrode 1. The gap voltage Vg is applied to the article and to the electrode in a manner described in, for example, FIG. 4.

Therefore, a power source terminal E+, on a positive side of the pulse generator 10, is connected to a portion of the article shown by reference numeral 34, via a cable 32. A power source terminal E−, on a negative side of the pulse generator 10, is connected to a brush 24 via a cable 28. The brush 24 is pressed down by a spring 26 against a holder 22, which is fixed to an insulating spindle 20, in such a manner that a constant supply of current is ensured. The holder 22 is conductively connected to the electrode 1 for an electric discharge machining process fixed to the holder 22. Accordingly, the power source terminal E− and electrode 1 are also conductively connected.

Figure 2:
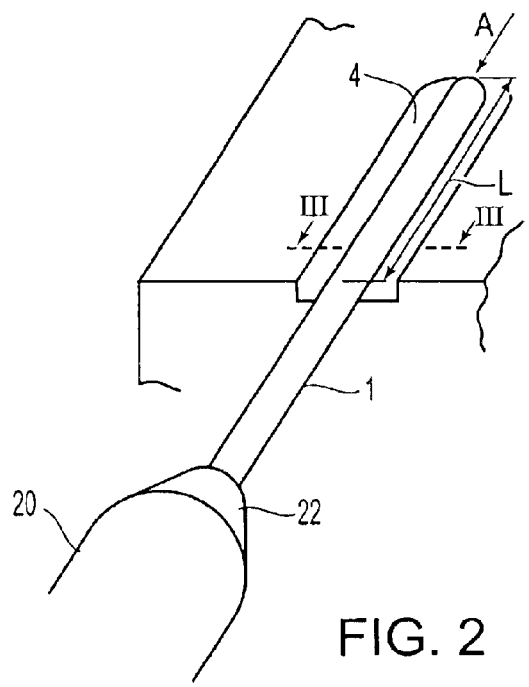
FIG. 2 is an enlarged view of the portion of FIG. 1 enclosed in the dotted area.

FIG. 2 is an enlarged view of a portion enclosed in the dotted area of FIG. 1. The portion of electrode 1 in which electric discharge pulses can be generated is the portion of length L measured from a free end thereof as shown in the drawing.

Figure 3:
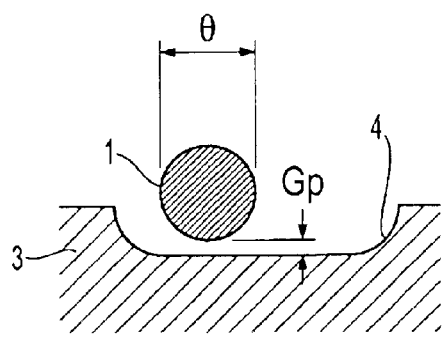
FIG. 3 is a sectional view taken along line III-III' in FIG. 2 and viewed in the direction of arrow A.

FIG. 3 is a sectional view taken along the line III-III' in FIG. 2 which includes the electric discharge machining electrode 1, and viewed in the direction of arrow A.

As shown in FIG. 3, the electric discharge machining electrode 1 keeps a clearance, which is an electric discharge gap Gp, with respect to the surface 4 to be machined of the article 3. In various embodiments, the electric discharge gap Gp is about 1 μm. In various embodiments, in gap Gp, machining liquid is made to drop by the dropping unit 40.

The electric discharge machining electrode 1 according to this embodiment will now be described.

The material of the electrode 1 for an electric discharge process is a superhard material obtained by sintering a mixture containing at least a fine powder of tungsten and cobalt. When the mixture is sintered, the cobalt is $^{59}Co$ existing in nature, and is not radioactive.

In this embodiment, for example, the electrode 1 for an electric discharge process is left in a nuclear reactor after the sintering operation finishes. For efficiency, it is preferable to batch process, e.g., several thousand electrodes at the same time. Neutrons are thereby applied to each electrode 1. When the cobalt is turned from $^{59}Co$ into $^{60}Co$, the electrodes 1 are taken out from the nuclear reactor. The intensity of the radioactivity is determined at this time to ascertain that the radioactivity is at least 100 M becquerel. Namely, it is ascertained by conducting a measurement operation that the electrodes 1 have a sufficient radioactivity.

When the cobalt is turned from $^{59}Co$ into $^{60}Co$, the cobalt comes to emit radiant rays, for instance as follows.

Firstly, beta rays of 0.3 MeV are emitted.
Secondly, gamma rays of 1.1 MeV are emitted.
Thirdly, gamma rays of 1.3 MeV are emitted.

Among these radiant rays, the beta rays are used in this mode of embodiment. The beta rays are currents of electrons. Therefore, when the electric discharge machining of an article is performed with a material containing cobalt $^{60}Co$ used as an electric discharge machining electrode which forms a negative pole, electrons are sent out therefrom without suffering from the influence of the work functions of the electrode 1, the article 3 and the processing liquid 5 interposed between the electrode 1 and the article 3.

An electric discharge machining electrode 1, the intensity of radioactivity of which has been ascertained as mentioned above, is fixed to a holder 22, and the holder 22 is secured to an insulating spindle 20 as shown in FIGS. 1 and 2. A pulse type gap voltage Vg is applied between the electrode 1 and the article 3 as a machining liquid 5 is dropped suitably therebetween from a dropping unit 40, to generate electric discharge pulses.

When the intensity of radioactivity in this embodiment is 100 M bequerel as mentioned above, 100 M electrons are emitted per second by the electrode 1 as a whole. The energy of these emitted electrons is 0.3 MeV. Namely, each emitted electron has energy accelerated at 300,000 V, and the electrons have enough energy to reliably pass through the machining liquid 5 over a distance of several micrometers even when the machining liquid 5 has insulating properties, so that the electrons can reliably pass through the electric discharge gap Gp shown in FIG. 3. Therefore, the electrons have the ability to undergo electric discharge in this embodiment. The same applies to a case where an article is machined by generating electric discharge pulses without using the machining liquid 5.

Figure 4:
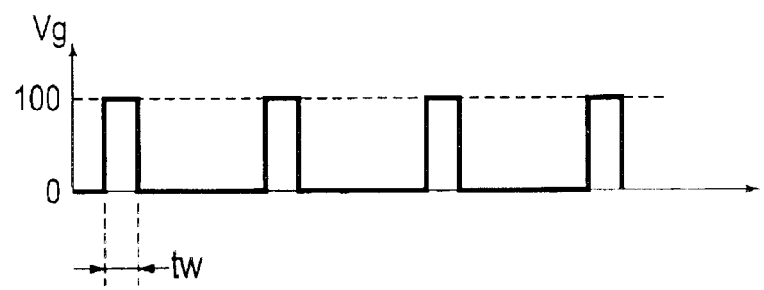
FIG. 4 is a time chart of a gap voltage Vg in the embodiment referred to above.

FIG. 4 is a time chart of the gap voltage Vg in this embodiment.

In this embodiment, a gap voltage Vg of about 100 V, as shown in FIG. 4, is generated by the pulse generator 10 and applied between the article 3 and the electrode 1. The pulse width tw is about 10 nano-seconds. When the intensity of radioactivity is about 100 M bequerel, as mentioned above, one electron on average is emitted every 10 nano-seconds. Accordingly, it becomes possible to reliably generate an electric discharge pulse even when the pulse width is as short as 10 nano-seconds.

In other words, an electric discharge is generated every time one beta ray is emitted, causing one electron to be emitted. Consequently, the electric discharge frequency increases greatly, and the electric discharge generation rate η approaches 100%.

In this embodiment, the electric discharge generation rate η can be maintained at 100% even when a gap voltage Vg of about 100 V has a very small pulse width such as, for instance, 10 nano-seconds, or even when the article 3 is small and cannot take a large electrode opposite to it. Therefore, a finely machined surface made of a sub-specular surface of high appearance quality can be obtained without causing the machining rate to decrease. Thus, in this embodiment, the present invention can be applied thereto effectively, and excellent properties can be obtained.

The half life of cobalt $^{60}Co$ is five years. Therefore, when cobalt $^{60}Co$ is stored for about twenty years, the radioactivity thereof is attenuated to about 1/16 of its original radioactivity. Accordingly, the disposal of a used electric discharge machining electrode 1 can be carried out easily because of the lowered radioactivity of the electrode.

According to the present invention, the quality of a finished surface of an article can be improved by improving the electric discharge generation rate η, even in a fine machining operation, and even when the conditions, such as the time width and the voltage of the electric discharge pulses applied to the electric discharge machining electrode, are the same, and thereby improving a machining speed, and by rendering it possible to maintain substantially constant the electric discharge generation rate η, even when the time width of the pulses and the applied voltage are reduced. The present invention is especially suitable for a micro electric discharge machining process.

What is claimed is:

1. An electric discharge machining electrode used for machining the surface of an article by generating electric discharge pulses between the article and the electrode disposed with a clearance kept with respect to the article, the electrode comprising a radioactive material contained in or near at least the part of a portion of the electrode in which the electric discharge pulses occur.

2. An electric discharge machining electrode according to claim 1, wherein:

the radioactive material for the electrode is a material obtained by sintering a mixture containing at least a fine powder of tungsten and cobalt, neutrons are applied to the material, radioactive cobalt atoms being thereby created to form a radioactive material, the radioactive material being used as a negative pole.

3. An electric discharge machining apparatus comprising an electric discharge machining electrode according to claim 1.

4. An electric discharge machining apparatus comprising an electric discharge machining electrode according to claim 2.

* * * * *